US012260391B2

United States Patent
Kim et al.

(10) Patent No.: US 12,260,391 B2
(45) Date of Patent: Mar. 25, 2025

(54) PAYING TELEPHONIC ORDER BY TAPPING CARD ON MOBILE PHONE

(71) Applicant: CALLGATE CO., LTD., Seoul (KR)

(72) Inventors: Yongjin Kim, Seoul (KR); Han Yeol Ahn, Seoul (KR); Kang Min Lee, Mountain View, CA (US); Seunghyuk Her, Seoul (KR)

(73) Assignee: CALLGATE CO., LTD., Seoul (KR)

( * ) Notice: Subject to any disclaimer, the term of this patent is extended or adjusted under 35 U.S.C. 154(b) by 0 days.

(21) Appl. No.: 18/376,408

(22) Filed: Oct. 3, 2023

(65) Prior Publication Data

US 2024/0112171 A1 Apr. 4, 2024

(51) Int. Cl.
| | | |
|---|---|---|
| *G06Q 30/00* | (2023.01) | |
| *G06Q 20/32* | (2012.01) | |
| *G06Q 20/34* | (2012.01) | |
| *G06Q 20/40* | (2012.01) | |
| *G06Q 30/0251* | (2023.01) | |
| *G05B 19/418* | (2006.01) | |

(52) U.S. Cl.
CPC ....... *G06Q 20/3278* (2013.01); *G06Q 20/352* (2013.01); *G06Q 20/4014* (2013.01); *G06Q 30/0267* (2013.01)

(58) Field of Classification Search
CPC ............. G06Q 20/3278; G06Q 20/352; G06Q 20/4014; G06Q 30/0267
See application file for complete search history.

(56) References Cited

U.S. PATENT DOCUMENTS

| | | | |
|---|---|---|---|
| 8,938,056 B2 | 1/2015 | Kim | |
| 9,721,319 B2 | 8/2017 | Smets et al. | |
| 9,805,370 B1 * | 10/2017 | Quigley | ................... H04W 4/80 |
| 2009/0192912 A1 * | 7/2009 | Griffin | ................... G06Q 20/40 |
| | | | 705/40 |

(Continued)

FOREIGN PATENT DOCUMENTS

| | | |
|---|---|---|
| KR | 10-2009-0051284 A | 5/2009 |
| KR | 10-1369981 B1 | 3/2014 |
| KR | 10-2014-0104241 A | 8/2014 |

(Continued)

OTHER PUBLICATIONS

•"Overview of a payment solution for NFC-Enabled Mobile phones". IEEE. 2016. (Year: 2016).*

(Continued)

*Primary Examiner* — Maria V Vanderhorst
(74) *Attorney, Agent, or Firm* — Hyounggook Lee

(57) ABSTRACT

The present application relates to a payment system in a call system such as home shopping, and more specifically, to the NFC simple payment system for the call system that allows NFC simple payment to be made using the customer's physical card while connected to a phone call. The present application discloses providing NFC simple payment system for call system that requests payment through the customer's mobile phone terminal means during the phone calling, and in response to this, the NFC payment can be made by the user contacting the card to the mobile phone terminal means, thereby allow users to easily make payments while on the phone by contacting only his/her own card without a separate authentication procedure.

20 Claims, 10 Drawing Sheets

(56) References Cited

U.S. PATENT DOCUMENTS

2015/0213436 A1* 7/2015 Griffin .................... H04L 67/04
                                                       705/44
2023/0016458 A1* 1/2023 Doumar ............. G06F 16/9554

FOREIGN PATENT DOCUMENTS

| KR | 10-1863230 B1 | 7/2018 | | |
|----|---------------|--------|---|---|
| KR | 10-2019-0025522 A | 3/2019 | | |
| KR | 10-2020-0020278 A | 2/2020 | | |
| MX | 2008012503 A1 * | 12/2008 | ............ | G06Q 20/10 |
| WO | WO-2017006194 A1 * | 1/2017 | | |

OTHER PUBLICATIONS

"Pay-Cloak: A Biometric Back Cover for Smartphones". IEEE. 2017. (Year: 2017).*

* cited by examiner

Please place the card on the back of the mobile phone.
If the card is recognized, the card number will be input automatically.

PAYING TELEPHONIC ORDER BY TAPPING CARD ON MOBILE PHONE

INCORPORATION BY REFERENCE TO ANY PRIORITY APPLICATIONS

Any and all applications for which a priority claim is made in the Application Data Sheet are hereby incorporated by reference in their entirety.

TECHNICAL FIELD

The present disclosure relates to a payment system in a call system such as home shipping, and more specifically, to the NFC simple payment system for the call system that allows NFC simple payment to be made using a customer's physical card while connected to a phone call.

BACKGROUND

As the number of cable channels increases, home shopping through cable has become common, and purchasing products through home shopping has become routine.

In such home shopping that takes place on cable TV and online, a person in charge is provided with payment information of the customer, i.e. credit card information, while on the phone with the customer, and completes a sales of a product.

As such, in home shopping, the credit card information such as a desired card selection, a card number, and an expiration date needs to be input in the case of card payments utilized by the majority of customers when making a phone call, but many customers tend to drop out during the information input stage.

Although the card information of the customer is stored and a service to be retrieved upon payment may be provided, there is still the inconvenience at the time of initial registration and even if a specific card has been registered, the discount rate and benefit may be different for each card company depending on the purchase, so that there be cases where an unregistered card is used and the re-registration may be required as the card usage period expires, resulting in a situation where the registered card cannot be continued to be used.

SUMMARY

An aspect of the invention provides a method for a sales transaction using a phone. The method comprises: during a telephone call between a buyer and a seller for a sales transaction, receiving, by a phone of the buyer, at least one communication (referred to as "a first communication") that is specifically designed for causing the phone to determine if a near field communication (NFC) functionality of the phone is active and for causing the phone to provide a suggestion for tapping a payment card with the phone to proceed with a payment of an amount for the sales transaction, wherein if it is determined that the NFC functionality of the phone inactive, the phone is to initiate a process to activate the NFC functionality or to generate a notification to the buyer for activating the NFC functionality; in response to tapping of an NFC-enabled payment card with the phone and still during the telephone call between the buyer and the seller, communicating, by the phone, with an NFC-enabled payment card to receive identification information for use in identifying the NFC-enabled payment card; subsequent to receiving the identification information and still during the telephone call between the buyer and the seller, sending, by the phone, the identification information or an equivalent thereof to at least one server for processing the payment of the amount for the sales transaction with an account associated with the NFC-enabled payment card; and further subsequent to sending the identification information and still during the telephone call between the buyer and the seller, receiving, by the phone, at least one communication (referred to as "a second communication") for causing to display information confirming the payment for the sales transaction on the display screen.

In the method, the first communication may activate a mobile application pre-installed on the phone and to cause the mobile application to determine if the NFC functionality of the phone is active, and if it is determined that the NFC functionality of the phone inactive, the mobile application may initiate the process to activate the NFC functionality or the notification to the buyer to activate the NFC functionality. Further in the method, the mobile application installed on the phone may be configured to detect a telephone number in response to an outgoing telephone call from the phone and further configured to retrieve an internet content pre-associated with the telephone number for displaying on the display screen of the phone. Further in the method, the mobile application installed on the phone may be configured to trigger displaying of an internet content pre-associated with a third person in response to receipt of at least one communication initiated by the third person during a telephonic conversation with the third person.

In the method, upon receiving the identification information and still during the telephone call between the buyer and the seller, the phone may send the identification information or the equivalent thereof to the at least one server. The equivalent thereof may comprise a processed version of the identification information that can be used to identify the NFC-enabled payment card. The first communication may be initiated by the seller. The phone may receive the first communication from at least one server that is not under control by the seller. The telephone call between the buyer and the seller may be initiated by the buyer using the phone while the seller is broadcasting a promotional content of a product or service that is at least part of the sales transaction.

An aspect of the invention provides a second method for a sales transaction using a phone. The second method comprises: during a telephone call between a buyer and a seller for a sales transaction, receiving, by a phone of the buyer, at least one communication (referred to as "a first communication") that is specifically designed for activating a mobile application pre-installed on the phone, for confirming that an NFC functionality of the phone is active for NFC communications, for displaying on a display screen of the phone a suggestion for tapping a payment card with the phone to proceed with a payment of an amount for the sales transaction; in response to tapping of an NFC-enabled payment card with the phone and still during the telephone call between the buyer and the seller, communicating, by the phone, with an NFC-enabled payment card to receive identification information for use in identifying the NFC-enabled payment card; subsequent to receiving the identification information and still during the telephone call between the buyer and the seller, sending, by the phone, the identification information or an equivalent thereof to at least one server for processing the payment of the amount for the sales transaction with an account associated with the NFC-enabled payment card; and further subsequent to sending the identification information and still during the telephone call between the buyer and the seller, receiving, by the phone, at least one communication (referred to as "a second communication") for causing to display, on the display screen, information confirming the payment for the sales transaction.

In the second method, the mobile application installed on the phone may be configured to detect a telephone number in response to an outgoing telephone call from the phone and further configured to retrieve an internet content pre-associated with the telephone number for displaying on the display screen of the phone. The mobile application installed on the phone may be configured to trigger displaying of an internet content pre-associated with a third person in response to receipt of at least one communication initiated by the third person during a telephonic conversation with the third person.

In the second method, upon activation, the mobile application may determine if the NFC functionality of the phone is active, and if it is determined that the NFC functionality of the phone inactive, the mobile application may initiate a process to activate the NFC functionality or to generate a notification to the buyer for activating the NFC functionality. Upon receiving the identification information and still during the telephone call between the buyer and the seller, the mobile application may cause the phone to send the identification information or the equivalent thereof to the at least one server.

In the second method, the equivalent thereof may comprise a processed version of the identification information that can be used to identify the NFC-enabled payment card. The first communication may be initiated by the seller. The phone may receive the first communication from at least one server that is not under control by the seller. The telephone call between the buyer and the seller may be initiated by the buyer using the phone while the seller is broadcasting a promotional content of a product or service that is at least part of the sales transaction.

An aspect of the invention is directed to providing an NFC simple payment system for call system that requests payment through the customer's mobile phone terminal means during the phone calling, and in response to this, the NFC payment can be made by the user contacting the card to the mobile phone terminal means, thereby allow users to easily make payments while on the phone by contacting only his/her own card without a separate authentication procedure. In embodiments, technical feature of the NFC mobile payment system of the call system include one or more of the following: (a) it allows customers on the phone call to easily make payments by contacting their payment card to their terminal device, thereby minimizing customer dropouts during the payment process and increasing the rate of successful purchases, and (b) it allows NFC payment to be made while the phone call is connected, allowing both merchant (call system) and customer (mobile phone terminal means) to authenticate with phone numbers, thereby enabling users to easily make payments without a separate authentication process in the mobile environment and providing the system that can be used safely.

In embodiments, a system for NFC simple payment service for call system is characterized in that it provides the simple payment service during the call that in response to the payment request information provided together with the request for simple payment service for call system 200 for the mobile phone terminal means 300 connected to the call system 200, the simple payment application program of the mobile phone terminal means 300 is activated to request NFC payment, and to receive the user's card information collected in response to the NFC payment request from the mobile phone terminal means 300 and to transmit it to the call system 200 or payment system 400. Further, in embodiments, the call system 200 is configured as the call system operated on a cloud basis provided by the payment service system 100.

In embodiments, the system for NFC simple payment service for call system is characterized in that it is configured by including: the user's mobile phone terminal means 300 that includes a wired/wireless communication access and NFC functions, and have an application program installed to perform NFC payment in response to the request for payment from the payment service system 100 through the wired/wireless communication network; the call system 200 that carry out the payment process by requesting the simple payment service from the payment service system 100 for the user's payment information, and sending the user's card information received from the payment service system 100 in response to the request for simple payment service to the payment system 400 and requesting payment authorization; and the payment service system 100 that provides the simple payment service during the call by requesting payment from the mobile phone terminal means 300 in response to the request for simple payment service of call system 200 and transmitting card information provided from the user's mobile phone terminal means 300 to the call system 200.

Further, in embodiments, the system is characterized in that it is configured that the said call system 200 includes: an agent communication means 210 that connects the call with the mobile phone terminal means 300 to enable the user to make the call by the agent or ARS and provides the call environment; a payment request means 220 that sends payment request information to the payment processing system 100 through the wired or wireless communication network for the simple payment selection of the ARS or the agent, to request the simple payment service; and a payment means 230 that carries out payment by receiving card information of the user collected by the mobile phone terminal means 300 from the payment service system 100 and requesting card payment authorization to the payment system 400, and the said payment service system 100 includes: a simple payment service means 110 that requests NFC simple payment through the simple payment application program installed on the user's registered mobile phone terminal means 300 in response to the simple payment service request from the call system 200, and provides the collected user's card information to the call system 200; a merchant management means 120 for managing the merchant registration; and a storage means 140 that store a user registration management means 130 for providing simple payment application program to be installed on mobile phone terminal means 100 and managing user registration of simple payment application program, the simple payment service history information, the user registration information, and the merchant registration information.

Further, in embodiments, payment request information provided from the call system 200 to the payment service system 100 includes phone number information or phone number information and payment information of the user's mobile phone terminal means 300.

Further, in embodiments, the method for NFC simple payment service for call system is characterized in that it consists of including: a process in which the payment service system 100 receives payment request information containing phone number information of the mobile phone terminal means 300 of the user currently connected to the call from the call system 200 and receives the request for simple payment service; a process in which the payment service system 100 determines whether the phone number of the mobile phone terminal means 300 is of the registered user and if so, requests communication to the mobile phone terminal means 300, to confirm whether the simple payment application program is installed and running on the mobile phone terminal means 300, and thereby confirms whether that user is currently capable of making NFC payment; a process in which if the user's mobile phone terminal means 300 is currently capable of NFC payment, the payment service system 100 makes the request NFC simple payment to the user through the simple payment application program installed on the user's mobile phone terminal means 300 in response to the simple payment service request received from the call system 200; and a process in which if the payment service system 100 receives the user's card information collected through NFC payment of the mobile phone terminal means 300, the received card information is transmitted to the payment system 400 or call system 200.

In addition, in embodiments, the method for NFC simple payment service for call system is characterized in that it consists of including: a process in which the payment service system 100 receives payment request information containing phone number information of the mobile phone terminal means 300 of the user currently connected to the call from the call system 200 and receives the request for simple payment service; a process in which the payment service system 100 determines whether the phone number of the mobile phone terminal means 300 is of the registered user and if so, requests communication to the mobile phone terminal means 300 and checkes whether the simple payment application program is installed and running on the mobile phone terminal means 300, and confirms whether that user is currently capable of making NFC payment; a process in which if the user's mobile phone terminal means 300 is currently capable of NFC payment, the payment service system 100 makes the request NFC simple payment to the user through the simple payment application program installed on the user's mobile phone terminal means 300 in response to the simple payment service request received from the call system 200; and a process in which if the payment service system 100 receives the card information collected through NFC payment from the mobile phone terminal means 300, the received card information is transmitted to the payment system 400.

In addition, in embodiments, the method for NFC simple payment service for call system is characterized in that it consists of including: a first process performed in the call system 200, which provides payment request information for the mobile phone terminal means 300 to the payment service system 100 and requests simple payment service while the call is connected to the user's mobile phone terminal means 300; a third process performed in the payment service system 100, which determines whether the user is the registered user by checking the phone number of the mobile phone terminal means 300 for which the simple payment service has been requested and if so, requests communication to the mobile phone terminal means 300, to confirm whether the simple payment application program is installed on the mobile phone terminal means 300, and thereby confirms whether that user is currently capable of making NFC payment; a fifth process performed in the payment service system 100, which when the user's mobile phone terminal means 300 is currently in the state where NFC payment is possible, requests the user to make the NFC simple payment through the simple payment application program installed on the user's mobile telephone terminal means 300 in response to the request for simple payment service received from the call system 200; a sixth process performed in the mobile phone terminal means 300, which activates the simple payment application program in response to the communication request from the payment service system 100, determines the status of the NFC function, activates the NFC function if it is not activated, and displays and provides NFC card payment guidance information to the user;

a seventh process performed in the mobile phone terminal means 300, which performs NFC card payment when the payment card is tagged, reads card information required for card payment, and transmits the card information read to the payment service system 100;

an eighth process performed in the payment service system 100, which transmits the received card information to the call system 200 when the card information collected through NFC payment from the mobile phone terminal means 300 is received;

a ninth process performed in the call system 200, which requests payment authorization by sending card information together with payment information containing the payment amount when the call system 200 receives card information from the payment service system 100;

a tenth process performed in the payment system 400, which confirms the card information and the payment information when payment authorization is requested from the call system 200, performs the payment authorization process, and transmits the payment authorization information to the call system 200; and an eleventh process performed in the call system 200, which completes the payment process when payment authorization information is received from the payment system 400, and provides that payment is completed to the user's mobile phone terminal means 300.

In addition, in embodiments, the method for NFC simple payment service for call system is characterized in that it consists of including:

a first process performed in the call system 200, which provides payment request information containing phone number information and the amount of payment for the mobile phone terminal means 300 to the payment service system 100 and requests simple payment service while the call is connected to the user's mobile phone terminal means 300;

a third process performed in the payment service system 100, which determines whether the user is the registered user by checking the phone number of the mobile phone terminal means 300 for which the simple payment service has been requested and if so, requests communication to the mobile phone terminal means 300, to confirm whether the simple payment application program is installed on the mobile phone terminal means 300, and thereby confirms that the user is currently in the state where NFC payment is possible;

a fifth process performed in the payment service system 100, which when the user's mobile phone terminal means 300 is currently in the state where NFC payment is possible, requests the user to make the NFC simple payment through the simple payment application program installed on the user's mobile telephone terminal means 300 in response to the request for simple payment service received from the call system 200; a sixth process performed in the mobile phone terminal means 300, which activates the simple payment application program in response to the communication request from the payment service system 100, determines the status of the NFC function, activates the NFC function if it is not activated, and displays and provides NFC card payment guidance information to the user; a seventh process performed in the mobile phone terminal means 300, which performs NFC card payment when the payment card is tagged, reads card information required for card payment, and transmits the card information read to the payment service system 100; a twelfth process performed in the payment service system 100, which transmits the received card information and the payment information provided from the call system 200 to the payment system 400 as payment authorization request information when the card information collected through NFC payment from the mobile phone terminal means 300 is received; and a thirteenth process performed in the payment system 400, which confirms the card information and the payment information when payment authorization is requested from the payment service system 100, performs the payment authorization process, and transmits the payment authorization information to the call system 200 or the payment service system 100.

An aspect of the invention provides a non-transitory computer-readable medium for use on a computer system. The non-transitory computer-readable medium may contain computer-executable programming instructions may cause one or more processors to perform one or more methods or steps described herein.

Additional features and advantages of the disclosed method and apparatus are described in, and will be apparent from, the following Detailed Description and the drawings of the present application. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

FIG. 5 is an example of providing tag guidance information for the payment card, FIG. 6 is an example of providing the product name and payment amount information together.

DETAILED DESCRIPTION

Hereinafter, implementations of the invention will be described with reference to the drawings. These implementations are provided for better understanding of the invention, and the invention is not limited only to the implementations. Changes and modifications apparent from the implementations still fall in the scope of the present invention. Meanwhile, the original claims constitute part of the detailed description of this application.

Paying Telephonic Order by Tapping Card on Mobile Phone

An embodiment of the invention discloses a process to place an order during a telephone call and to complete payment for the order during the same telephone call over the phone. A buyer watches a commercial or home shopping program on a television or a computer screen. The commercial advertises a product or service, and displays a phone number of a seller. The buyer, using a phone, places a call to the displayed phone number. The call connects the buyer to a representative or agent of the seller such that the buyer can communicate with the representative about the product while watching the commercial. During the ongoing telephone conversation, the buyer may place an order of the product to the seller's representative. In response to the order, the seller's representative initiates a payment process. A payment request is sent to the buyer's phone. The payment request is configured such that a near-field communication (NFC) function of the phone can be activated automatically or manually by the buyer. The phone prompts the buyer to physically tap a payment card onto the phone. When the buyer taps a payment card, the phone reads, using its NFC module, information of the payment card and communicates with a payment server for initiating a payment process. When the payment process is completed, the seller's representative receives a payment confirmation of the order, and tells the buyer that the order has been paid over the phone. The whole process can be completed while the telephone call between the buyer and the seller's representative is ongoing (and further while the commercial or home shopping program is airing). The buyer does not need to provide a payment card number to the representative over the phone.

Telephone Call to Seller (S910)

Figure 1:
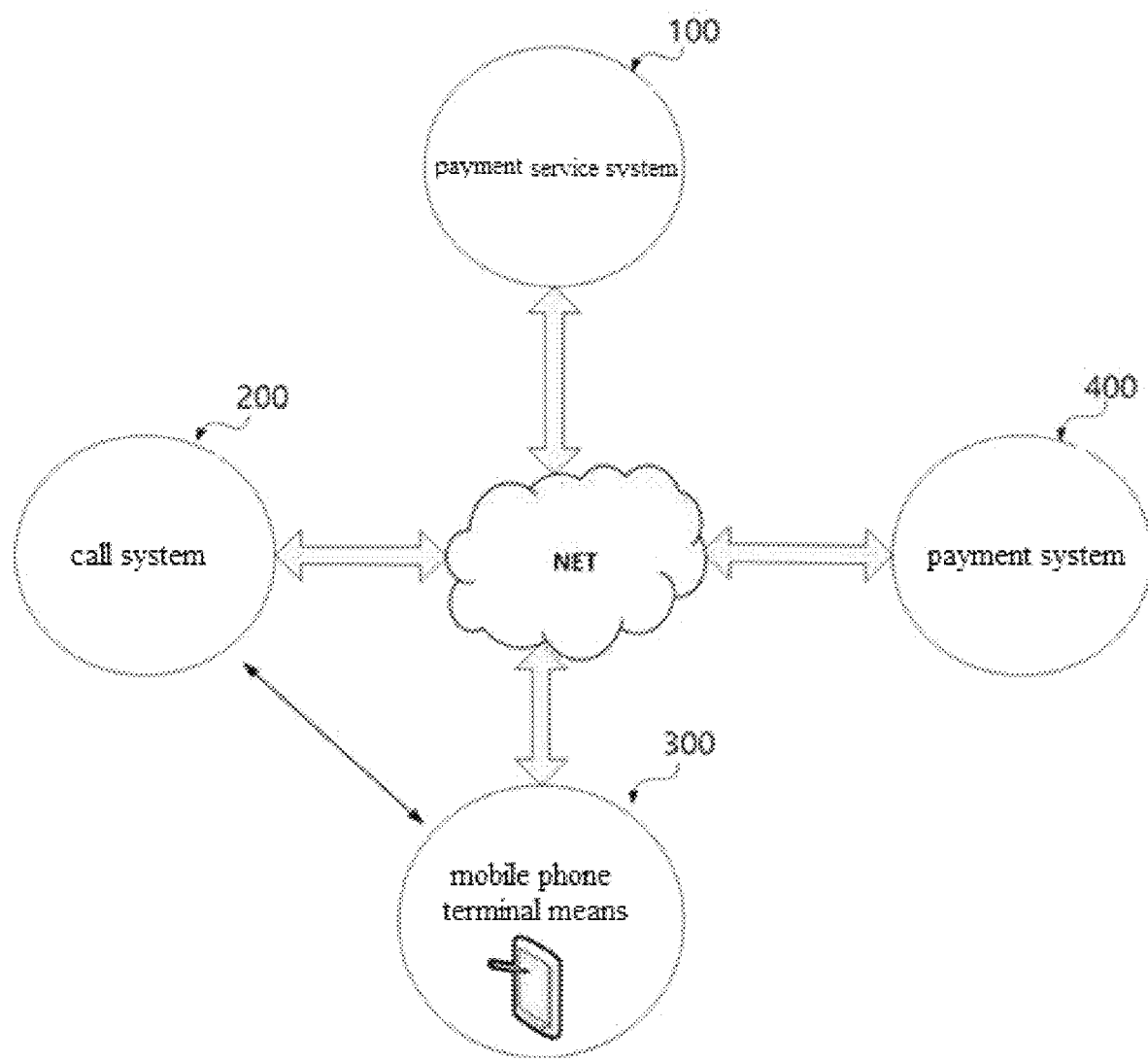
FIG. 1 is a schematic configuration of the NFC simple payment service system of a call system according to an embodiment.
Figure 8:
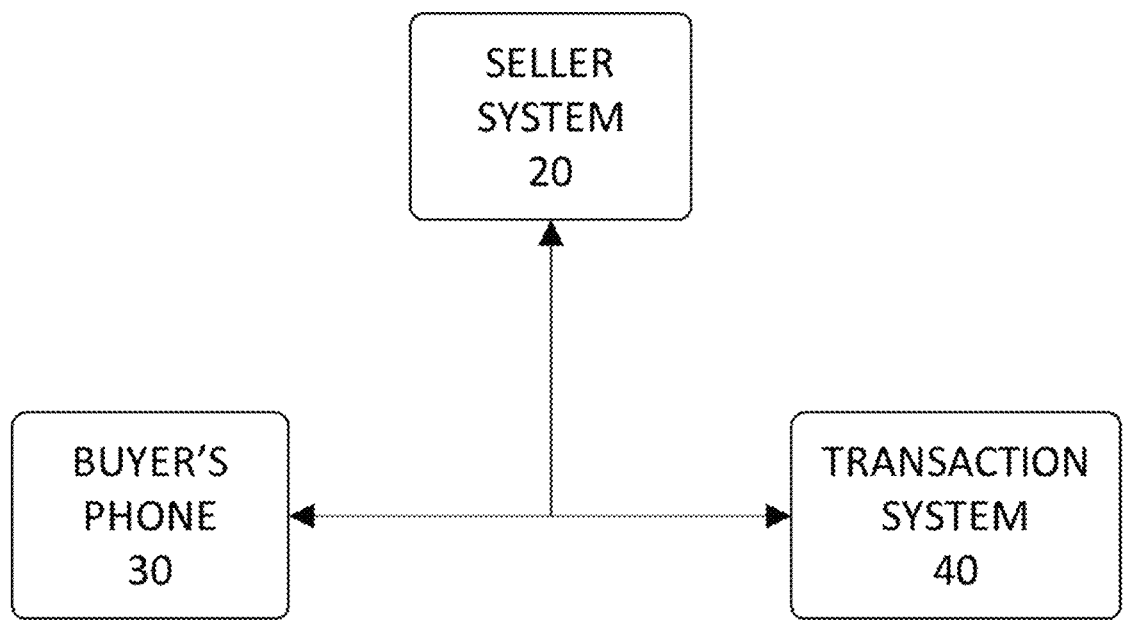
FIG. 8 is a diagram of an environment in which payment for a telephonic order is processed without telling payment information over the phone.
Figure 9:
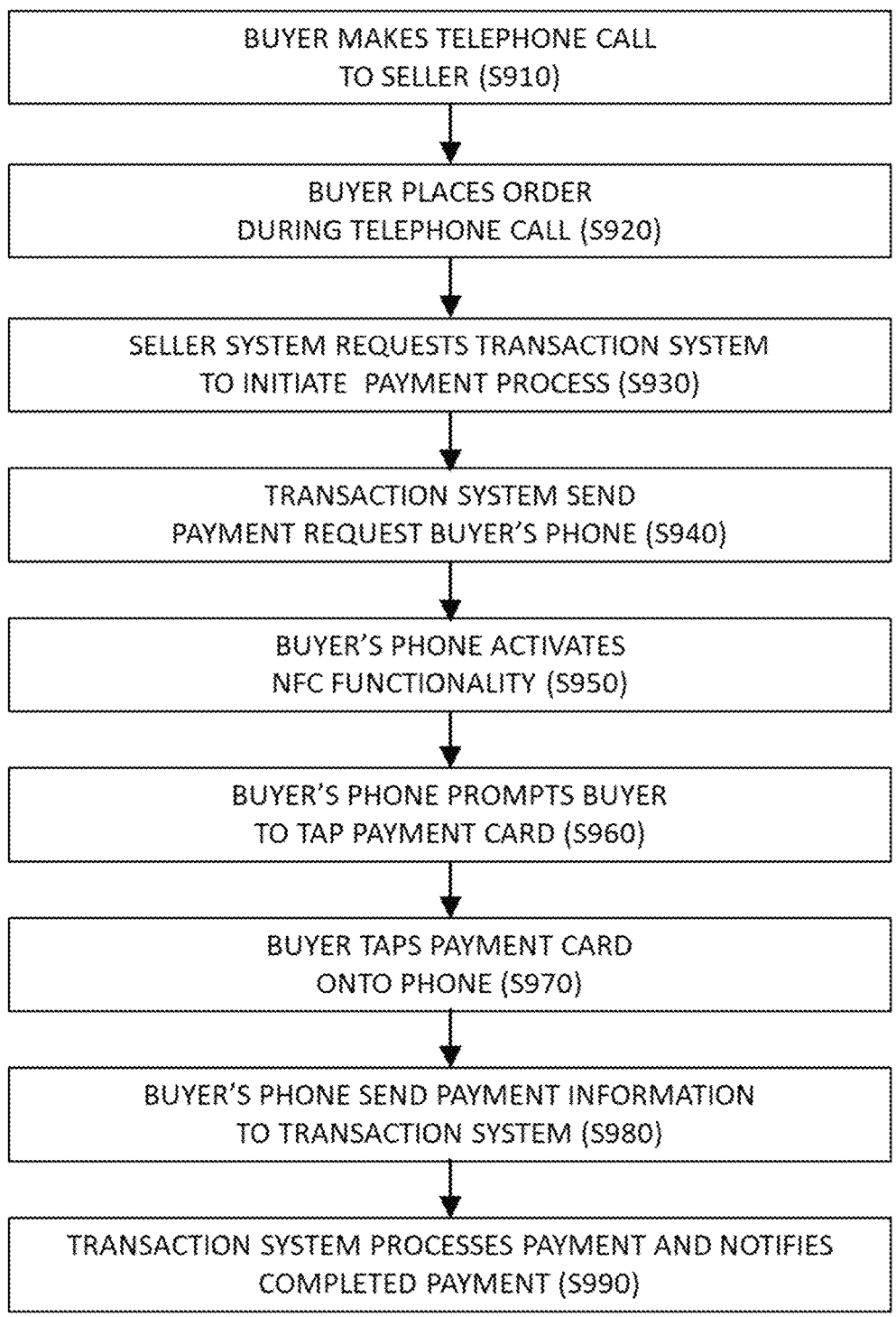
FIG. 9 is a to process to complete payment for a telephonic order.

When the buyer uses a phone 30 (FIG. 8) to make a call to the seller, the seller response the incoming call using a seller system 20. The seller system 20 (FIG. 8) may include one or more selected from the group consisting of: a telephone or terminal device of the seller's human representative, an automated response system (ARS), a computerized telephone call system, and features of a caller system 200 (FIG. 1). The seller system may establish a telephone call between the buyer and the representative, record or process a verbal communication of the call, and record or process a non-verbal interaction happening during the call. The seller system may commute with the buyer's phone 30 (mobile terminal, 300) and another computing system for handling and processing the buyer's order. For example, the seller system may communicate with an inventory system and a fulfilment system.

Seller Automatically Collects Buyer's Information

In response to the telephone call from the buyer, the seller system may use the caller ID of the call to obtain the buyer's phone number. Using the buyer's phone number, the seller system may obtain additional information about the buyer from a database connected to the seller system. The seller system may refer to the seller's customer database and public records, such as white pages. When necessary during the call, the seller system may request the buyer to provide information verbally over the phone or non-verbally using the phone's touchscreen or camera.

Verbal Ordering During Telephone Call (S920)

The buyer may place an order verbally during the telephone call. The byer may tell the seller's representative what the buyer wants to purchase. The buyer may specify name of a product (or service), quantity, and any specific details related to the product. The seller's representative may input the order details to the seller system.

Non-Verbal Ordering During Telephone Call (S920)

The buyer may also place an order non-verbally the telephone call. For instance, the buyer may, during the telephone call on the phone's touch screen, navigate through a digital catalog of the seller, tap on a desired product for add it to a shopping cart, review order details and tap to place an order. The buyer may take a picture of a quick-response (QR) code to open the seller's digital catalog or web page associated with the seller) and to place an order via the digital catalog or web page. The buyer may take a picture of a QR code or a product shown in the commercial and send the picture to the seller for placing an order during the telephone call. In embodiments, an order for initiating a payment process described below may be an order made without a telephone call to the seller. For example, the buyer may place an order using a web site or mobile application of the seller when he is watching the commercial.

Initiating Payment Process Via Transaction System (S930)

In response to the buyer's order, the seller system 20 may send a request to a transaction system 40 (FIG. 8), prompting the transaction system to initiate a payment process for the order. The request to the transaction system may include identification and/or details of the order. For example, the request may include one or more of identification of an ordered item (service), specification of the ordered item, the total amount due (payment amount), the buyer's phone number, the buyer's address or other contact information.

Payment Request to Buyer's Phone (S940)

Based on the seller system's request, the transaction system 40 may generate and send a request for payment (payment request) to the buyer's phone. The payment request may include an instruction(s) to the phone such the phone can take one or more actions according the instruction to prepare the phone ready for the payment. The payment request may include a text or multimedia message asking the buyer to take an action for the payment. For example, the payment request may include one of more of a push notification to the buyer's phone; a text or multimedia message to the buyer's phone number; and an instruction for a mobile application on the phone.

Preparing NFC Functionality for Payment Via Payment Request

The payment request may be designed for payment using the phone's NFC functionality. The payment request may include an instruction for the phone to get its NFC functionality ready for payment. The payment request may include a message asking that the buyer confirm that the phone's NFC Functionality is ready to receive payment. The buyer may confirm that the phone is ready for payment by replying to the message or by selecting a link in the message.

Checking Phone's NFC Functionality

In response to the payment request, the phone may initiate a process to check if the phone has an NFC functionality, and if the NFC functionality is turned on or active for receiving payment. A mobile application installed on the phone may call a function of the phone's operating system or another software on the phone for checking the NFC functionality.

Activating Phone's NFC Functionality (S950)

When it is determined that the phone's NFC functionality is inactive (or the phone is not ready to receive data from a payment card), the phone initiates a process to activate the NFC functionality. A mobile application installed on the phone may activate (wake up) the phone's NFC module and get the NFC module ready to obtain data from a payment card.

Buyer's Action for Activating NFC Functionality

When a mobile application cannot activate the phone's NFC functionality by itself without the buyer additional action, the mobile application prompts the buyer to take action for activating the phone's NFC functionality. The buyer may need to open a configuration menu of the phone and turn on the phone's NFC functionality manually.

Prompting to Tap Payment Card (S960)

When the phone's NFC functionality is activated, the phone prompts the buyer to tap a payment card onto the phone. A mobile application on the phone may generate a visual or audio notification to the buyer informing that the phone is ready for contactless payment for the buyer's order. The notification may include details of the buyer's order and a visual or audio guidance about how to make a contactless payment by tapping a payment card.

Transferring Card Information to Phone Via NFC Communication (S970)

When, the buyer taps a payment card (NFC-enabled card) onto the phone, the phone's NFC module may wirelessly communicate with the card and obtain data from the card. The data from the card may include a card identification information for use in identifying the payment card (or for identifying an account number of the card). The card identification information may include at least part of: the card number physically printed on the card; an equivalent of the card number; and an encrypted version of the card number. The card identification information may include at least part of: a payment account number linked to the card and equivalent of the card number; an equivalent of payment account number; and an encrypted version of the payment account. The card identification information may include data for use in obtaining the card number or the payment account number.

Sending Payment Information to Transaction System (S980)

The phone may prepare and send a request for completing payment to the transaction system. The request may include one or more selected from the group consisting of: identification and/or details of the buyer's order; the payment amount (the total amount due for the order), identification and/or details of the product being currently promoted on the commercial; identification and/or details of the seller (or the transaction system); the card identification information or its equivalent, the card number or its equivalent, the payment account number or its equivalent, and data obtained from processing at least one of the card number, the card identification information and the payment account number. The request may not include one or more of the examples, and may include data other than the example.

Transaction Process to Complete Payment (S990)

Based on the request from the phone, the transaction system conducts a transaction process to complete (record, authorize) payment of the buyer's order. The transaction process may include one or more selected from the group consisting of: processing the identification information (or its equivalent) to obtain the payment card's actual number (the number printed on the card); encrypting the actual card number; conducting a process for payment authorization; confirming of payment authorization; and sending a notification of authorized payment to the seller system. This transaction process may be similar to or substantially same as what happens after the payment card is swiped offline at a store.

Transaction Confirmation to Buyer's Phone (S990)

When the seller system receives the notification of the payment authorization from the transaction system, the seller system may send a notification to the buyer's phone confirming the payment. The transaction system may also send such a notification to the phone. In response to the notification, the phone provides a visual or audio notification to the buyer confirming the completed payment.

Hang up or Continue Telephone Call

The buyer may hang-up the telephone call after receiving a notification of completed payment. The buyer may continue the telephone call to confirm shipping schedule or additional details of the order.

Transaction Requires Connected Telephone Call

The phone, the seller system, and the transaction system may conduct one or more tasks for sales transaction only when a telephone call is connected between the phone and the seller system. For example, when the telephone call is disconnected, the seller system may not send the payment process initiating request to the transaction system, the transaction system may not send the payment request to the phone, the phone may not send the request for payment processing to the transaction system. In other embodiments, the phone, the seller system, and the transaction system may perform a task regardless of whether a telephone call is connected between the phone and the seller system.

Reconnecting Disconnected Telephone Call

When the telephone call is disconnected, the seller system may make a call back to the phone or send a message to the phone requesting a telephone call to the seller. The phone may try to reconnect, and the transaction system may send to the buyer's phone or the seller system a message to reconnect the telephone before taking further action.

Displaying Content of Seller During Telephone Call

When the buyer makes a call to the seller, the phone may identify the call recipient's number (the seller's number), retrieve an internet page or content (the seller's digital catalog) that is pre-associated with the recipient's number, and cause the phone's display to present the retrieved content. The internet page or content may be a digital catalog providing information about the seller's product currently on the commercial that the buyer is watching. The internet page or content may include an interface that allows the buyer to review or choose details of the seller's product and to place an order.

Displaying Content of Third Party During Telephone Call

When the buyer makes a call to the seller, the phone may retrieve an internet page or content that is pre-associated with a third party other than the seller, and cause the phone's display to present the retrieved content. The internet page or content may include information from the transaction system to guide the buyer for making payment during the call. The information may include the amount to pay for the buyer's order and a visual or audio guidance about how to make payment during the telephone call.

Separate Content Server

In response to a telephone call from the buyer, a content server separate from the seller system (and the transaction system) provides the internet page or content pre-associated with the seller. In response to a telephone call from the buyer, the seller system (or the transaction system) may send a request for content to the content server. The request may include: the buyer's phone number (or another identification); specification (NFC capability) and configuration of the phone; identification and/or details of the product being currently promoted on the commercial; identification and/or details of the seller (or the transaction system); identification and/or details of the pre-associated content; identification and/or details of the buyer's order. The request may not include one or more of the examples, and may include data other than the example. Based on the request, the content server may send a push notification or instruction to the phone for providing contents, communicate with the phone, and transmit contents to the phone. In response to the push notification or instruction the phone may establish a socket connection with the content server. In embodiments, the content server may be part of the seller system or the transaction system.

Transaction Dependent on Connection with Content Server

The phone, the seller system, and the transaction system may conduct one or more tasks for sales transaction only when the phone is currently connected (or has been connected) to the content server, or only when the phone is displaying a particular content from the content server. For example, the phone may display a timer showing the time window for tapping the payment card. In embodiments, a task can be conducted regardless of connection with the content server.

Transaction System Operating Independently from Seller System

The transaction system 40 may operate independently and not be under the control of the seller, separate from the seller system. The seller system for handling telephonic orders may not have the full capability to process payments, and may utilize an outside payment service. For example, a home shopping seller may not have the full capability to handle NFC card payments, and may use a payment service of a credit card company or another financial institution. The transaction system 40 may include at least part of the payment service system 100 (FIG. 1) and the payment system 400 (FIG. 1) and may perform one or more functions of the payment service system 100 and the payment system 400. In embodiments, the seller system may generate and send the payment request to the buyer's phone without using an outside system, and may include one or more related features of payment service system 100 (FIG. 1) and payment system 400 (FIG. 1).

Transaction without Seller's Contactless Payment Terminal

The sales transaction discussed above does not require a payment terminal of the seller to read the buyer's payment card. The buyer may make a payment of the order using her/his own phone by tapping her/his own credit card without using a terminal of others (sellers or payment services). Information of the payment card is obtained using the phone's NFC module and transmitted to the transaction system (which may include at least part of the payment service system 100 and the payment system 400).

Data Communications Following NFC Card Tapping

In response to the tapping of the payment card, the phone may: obtain NFC Unique ID (UID) of the card via a first NFC communication; subsequently transmit the UID of the card to a security access module (SAM) system or server to request a password necessary for reading a predetermined block of the card that contains the card number; receive the password from the SAM system; access the predetermined block via a second NFC communication; obtain, via a third NFC communication, an encrypted version of the card number (or non-encrypted card number) along with additional data such as four-digit expiration date, transaction ID, etc.; transmit the encrypted card number to the SAM system along with a public key so that the SAM system can decrypt the card number and re-encrypt it using the public key; receive the re-encrypted card number from the SAM system; and transmit the re-encrypted card number to the transaction system (or the seller system) for payment of the buyer's order. Communications following the card tapping may not one or more of the example steps, and may include data other than the example steps.

Contactless Payment Technologies Other Than NFC

The phone 300 may use one or more contactless payment technologies other than NFC technology. Radio-frequency identification (RFID) or QR codes can be used. For another example, in response to a payment request from the transaction system, the phone prompts the buyer to take a picture of a payment card. The phone may send the picture or the card's number obtained from the picture to the transaction system in reply to the payment request.

Deactivating Phone's NFC Functionality

When payment has been completed (authorized, recorded) for the buyer's order, a process for deactivating the phone's NFC functionality may be performed. The phone may automatically deactivate the phone's NFC functionality or prompt the buyer to turn off manually. The seller system or the transaction system may send a communication to the phone to deactivate the phone's NFC functionality.

Mobile Application

A mobile application installed on the phone may conduct one or more of the aforementioned tasks for completing the sales transaction. For example, the mobile application may control one or more feature of the phone to: make a call to the seller; identify the seller's phone number from an outgoing call; locate a digital catalog or web page associated with the seller based on the seller's phone number; receive a digital catalog or web page from the content server; switch the phone's screen from a default call screen (including button for ending the call and putting the call on speaker) to another screen which provides the digital catalog or web page; present an interface for placing an order during the call; (in response to the payment request) check and activate the phone's NFC functionality; switch to another screen for prompt the buyer to tap a payment card; and switch to another screen for notifying completed payment. For these tasks, the mobile application may execute one or more of its internal software modules, utilize another application installed on the phone, or call an executable library of the phone's operating system.

Specific Instructions to Mobile Application

To perform the aforementioned tasks, the mobile application may receive an instruction(s) from the seller or the transaction server and control one or more features of the phone using the instruction for conducting one or more of the aforementioned tasks. The instructions may include one or more parameters according to a predetermined protocol known to the mobile application. For example, the payment request to the phone may include one or more selected from the group consisting of: the phone's identification or address; the mobile application's identification; a parameter specifying an action to be taken; a parameter specifying a software module or library to be executed for the action, an identification and/or details of the order; the order's payment amount; and identification of the seller.

Instructions in Predetermined Format

The payment request may be configured according to a predetermined format and/or protocol that the phone's operating system and software modules recognize. This allows the phone to identify one or more parameters of actions to take for the processing of payment of the order. The payment request may include one or more communication headers and data fields containing the parameters, in accordance with the predetermined format. The payment request may include one or more parameters (or data) selected from the group consisting of: identification of the mobile application, identification of pre-stored library(s) and command(s) on the phone, one or more executable codes or instructions (for example, for checking and/or activating NFC functionality), a time period for maintaining the NFC functionality active, a public key for encrypting and/or descripting data for use in payment of the order, identification and/or address of the transaction system, and identification and/or address of the seller system. On receiving the payment request, the phone may parse it according based on the predetermined format and prompts the mobile application and/or another executable software to perform one or more intended functions (for example, checking and activating NFC functionality, obtaining and handling data obtained from the payment card) according to the parameters obtained from the payment request.

Architecture of Computing System

Figure 10:
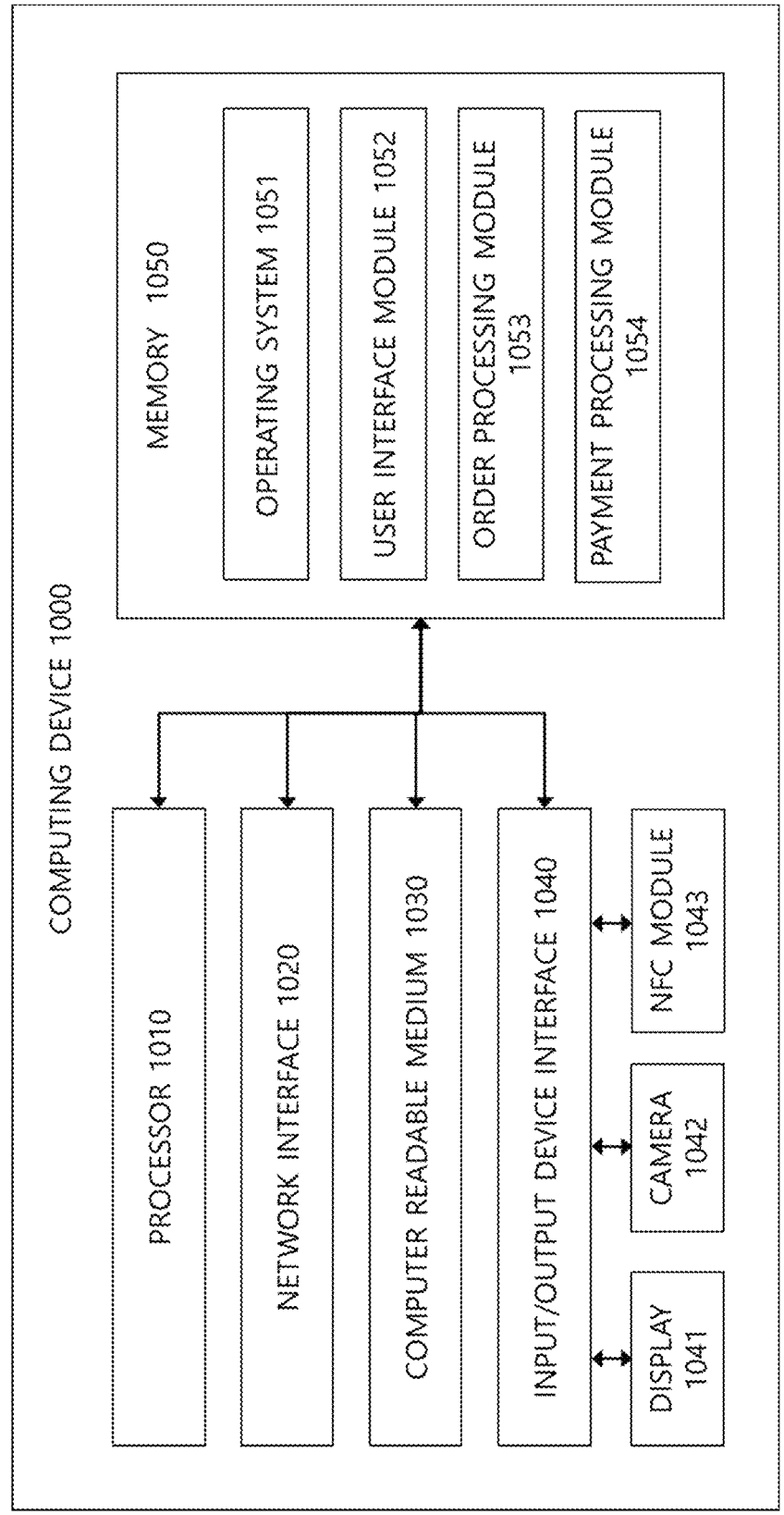
FIG. 10 is an architecture of a computing device that can be used to perform one or more feature of the invention.

FIG. 10 depicts an architecture of a computing device 1000 that can be used to perform one or more feature of the invention. The general architecture of the computing device may include an arrangement of computer hardware and software modules that may be used to implement one or more aspects of the present disclosure. The computing device may include many more (or fewer) elements than those shown in FIG. 10. It is not necessary, however, that all of these elements be shown in order to provide an enabling disclosure.

The computing device may include a processor 1010, a network interface 1020, at least one computer readable medium 1030, and an input/output device interface 1040, all of which may communicate with one another by way of a communication bus. The network interface may provide connectivity to one or more networks or computing systems. The processor may also communicate with a memory 1050 and further provide output information for one or more output devices, such as a display (e.g., display 1041), speaker, etc., via the input/output device interface 840. The input/output device interface may also accept input from one or more input devices, such as a camera 1042 (e.g., 3D depth camera), a NFC module (1043, hardware for NFC communication), keyboard, mouse, digital pen, microphone, touch screen, gesture recognition system, voice recognition system, accelerometer, gyroscope, etc.

The memory may contain computer program instructions (grouped as modules in some implementations) that the processor executes in order to implement one or more aspects of the present disclosure. The memory may include RAM, ROM, and/or other persistent, auxiliary, or non-transitory computer readable medium.

The memory may 1050 may store an operating system 1051 that provides computer program instructions for use by the processor in the general administration and operation of the computing device. The memory may further include computer program instructions and other information for implementing one or more aspects of the present disclosure.

For example, the memory may include a user interface module 105 that generates user interfaces (and/or instructions therefor) for display, for example, via a browser or application installed on the computing device. In addition to and/or in combination with the user interface module, the memory may include an order processing module 1053 executable by the processor for one or more tasks relating to handling and processing of a telephonic order, a payment processing module 1054 executable by the processor for one or more tasks relating to handling and processing of a telephonic order.

Although a single processor, a single network interface, a single computer readable medium, a singer input/output device interface, a single memory, a single camera, and a single display are illustrated in FIG. 10, in other implementations, the computing device can have a multiple of one or more of these components (e.g., two or more processors and/or two or more memories).

Additional Embodiments

Referring to FIG. 1, the call system 200 connected through the wired/wireless communication network and the payment service system 100 that provides simple payment services to mobile phone terminal means 300, so as to provide the NFC payment method to the user's mobile phone terminal means 300 connected to the call system 200 in response to the payment request from the call system 200, enabling the user to make the NFC simple payment through the user's mobile phone terminal means 300 while on the call.

Figure 2:
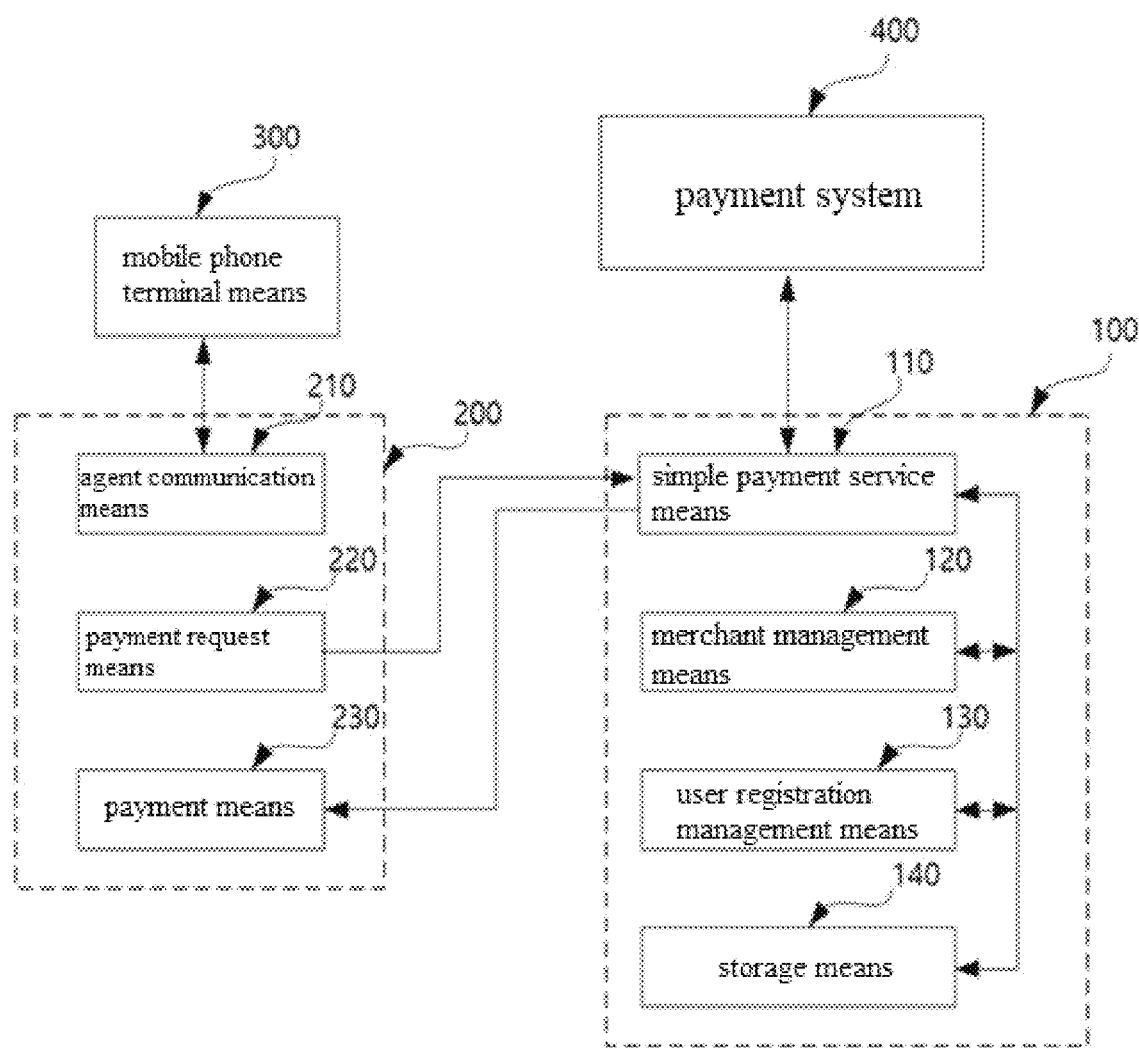
FIG. 2 is a block diagram showing a configuration of the NFC simple payment service system of a call system according to an embodiment.

More specifically, as shown in FIGS. 1 and 2, the NFC simple payment service system of call system in embodiments may be configured to include: the user's mobile phone terminal means 300 that includes the wired/wireless communication access and NFC functions, and have the application program installed to perform NFC payment in response to the request for payment of the call system 200 provided from payment service system 100 in communication with the payment service system 100 through the wired/wireless communication network; the call system 200 that carry out the payment process by requesting the simple payment service from the payment service system 100 for the user's payment information, and sending the user's card information received from the payment service system 100 in response to the request for simple payment service to the payment system 400 and requesting payment authorization; and the payment service system 100 that provides the simple payment service during the call by requesting payment from the mobile phone terminal means 300 in response to the request for simple payment service of call system 200 and transmitting card information provided from the user's mobile phone terminal means 300 to the call system 200.

On the other hand, in embodiments, the call system 200 may correspond to the call system operated internally that seller in the case of the seller that has its own call system, but in the case of vendor who do not have their own call system (such as individual business owners), it may correspond to the call system (or ARS call system program) operated on the cloud basis which is operated and provided by the business operator that has established the payment service system 100 or internally built the payment service system 100 in order to provide that vendor with the use of the call system.

When the call system 200 is configured as the call system operated on the cloud basis provided by the payment service system 100, the payment service system 100 may also be configured to perform the user's payment process by transmitting card information provided by the user's mobile phone terminal means 300 to the payment system 400 instead of to transmit it to the call system 200, and directly requesting payment authorization to the payment service system 400 by the payment service system 100.

The NFC simple payment system of the call system in embodiments as described above has a technical feature that allows consumer payments to be easily made to the seller while the consumer (user) and the seller (call system) are connected through the phone call.

The said call system 200 is the vendor such as a shopping mall, home shopping, and the like, and may be configured as the call system operated itself by the vendor registered as the merchant for the simple payment service provided by card merchants and the payment service system 100, and may include the agent communication means 210 that connects the call with the mobile phone terminal means 300 to enable the user to make the call by the agent or ARS and provides the call environment; the payment request means 220 that sends payment request information to the payment processing system 100 through the wired or wireless communication network in response to the simple payment selection of the ARS or the agent, to request the simple payment service; and the payment means 230 that carries out payment by receiving card information of the user collected by the mobile phone terminal means 300 from the payment service system 100 and requesting card payment authorization to the payment system 400.

The said mobile phone terminal means 300 is composed of a smart device such as a smartphone with the NFC function for making phone calls with the call system 200 and performing NFC simple payments, and is installed with the simple payment application program for providing the NFC payment means to the user in response to the NFC simple payment request from the payment service system 100 and providing card information for the user's NFC simple payment to the payment service system 100.

The said payment service system 100 may be configured by including the simple payment service means 110 that requests NFC simple payment through the simple payment application program installed on the user's registered mobile phone terminal means 300 in response to the simple payment service request from the call system 200, and provides the collected user's card information to the call system 200; the merchant management means 120 for managing the merchant registration to check whether the vendor using the call system 200 is the vendor (merchant) registered as the simple payment service merchant provided by the payment service system 100; and the storage means 140 that store the user registration management means 130 for providing simple payment application program to be installed on mobile phone terminal means 100 and managing user registration of simple payment application program, the simple payment service history information, the user registration information, and the merchant registration information.

On the other hand, when the merchant management means 120 receives the request for the simple payment service from the call system operated itself by the vendor registered as the simple payment service merchant, the vendor using the call system 200 performs a process of confirming whether the vendor is the vendor (merchant) registered as the simple payment service merchan, however, when the business operator that operates the simple payment service by building the payment service system 100 provides the vendor with the use of the call system (or ARS call system program) operated on the cloud basis, it is confirmed whether that seller is already the merchant at the time of using the call system, therefore the process of determining whether the vendor using the call system 200 is the vendor (merchant) registered as the simple payment service merchant may be omitted.

In the NFC simple payment system of the call system in embodiments, the said method for NFC simple payment service performed in the payment service system 100 consists of the following execution process.

It may consist of including a process in which the payment service system 100 receives payment request information containing phone number information of the mobile phone terminal means 300 of the user currently connected to the call from the call system 200 and receives the request for simple payment service; a process in which the payment service system 100 determines whether the phone number of the mobile phone terminal means 300 is of the registered user and if so, requests communication to the mobile phone terminal means 300, to confirm whether the simple payment application program is installed and running on the mobile phone terminal means 300, and thereby confirms whether that user is currently capable of making NFC payment; a process in which when the simple payment application program is not installed on the mobile phone terminal means 300 or when the phone number is not registered as the user, the payment service system 100 transmits installation link information for the simple payment application program to the mobile phone terminal means 300; a process in which if the user's mobile phone terminal means 300 is currently capable of NFC payment, the payment service system 100 makes the request NFC simple payment to the user through the simple payment application program installed on the user's mobile phone terminal means 300 in response to the simple payment service request received from the call system 200; and a process in which if the payment service system 100 receives the user's card information collected through NFC payment of the mobile phone terminal means 300, the received card information is transmitted to the call system 200.

In the process in which the payment service system 100 receives payment request information containing the phone number information of the user's mobile phone terminal means 300 from the call system 200 and receives the request for the simple payment service, a process which confirms merchant information to determine whether the merchant using the call system 200 is the registered merchant and determines whether or not simple payment service is provided to registered merchant, may be further performed. On the other hand, when the business operator that operates the simple payment service by building the payment service system 100 provides the vendor with the use of the call system (or call system program) operated on the cloud basis, the process of determining whether the merchant using the call system 200 is the registered merchant and determining whether or not simple payment service is provided to registered merchant, may be omitted.

Depending on the phone number registered (input) by the user or the phone number registered (known) by the call system 200, the user receives the call from the call system 200 to the user terminal means 300 or makes the call to the call system 200 through the user terminal means 300.

At this time, the agent call means 210 of the call system 200 may provide ARS or agent call response to the user's terminal means 300.

When the user selects in accordance with the guidance for simple payment through ARS, or payment for the product purchase is required during consultation with the agent, in response to the agent's selection, the call system 200 requests the simple payment service to the payment service system 100.

At this time, the call system 200 transmits payment request information containing the phone number information of the user's mobile phone terminal means 300 to the payment service system 100 and requests simple payment service. In addition, the call system 200 transmits payment information containing the product name or payment amount as well as the phone number information of the user's mobile phone terminal means 300 to the payment service system 100 as payment request information, and may request the simple payment service.

The payment service system 100 confirms payment request information provided in response to the simple payment service request from the call system 200 and confirms whether the user's phone number contained in the payment request information is the registered number.

On the other hand, the simple payment application program installed on the user's mobile phone terminal means 300 is the application program provided by the payment service system 100, wherein when the user installs the simple payment application program on her or his mobile phone terminal means 300, the payment service system 100 may obtain phone number information of that mobile phone terminal means 300 to store it in the storage means 140 as user registration information.

If the phone number of the mobile phone terminal means 300 is the user-registered phone number, it is confirmed whether that user is currently capable of making NFC simple payment by requesting communication to the mobile phone terminal means 300 and confirming whether the NFC simple payment application program is installed and running on the mobile phone terminal means 300.

When it is confirmed that the NFC simple payment application program is installed and running on the user's mobile phone terminal means 300, NFC simple payment is requested to the user through the simple payment application program installed on the user's mobile phone terminal means 300 in response to the simple payment service request received from the call system 200.

At this time, when the simple payment application program is not installed on the mobile phone terminal means 300 or when the phone number of the said mobile phone terminal means 300 is the phone number that has not been registered by the user, the payment service system 100 transmits the link information for installing the simple payment application to the mobile phone terminal means 300, allowing NFC payment to be made after installing the NFC simple payment application program and registering the user.

Figure 5:
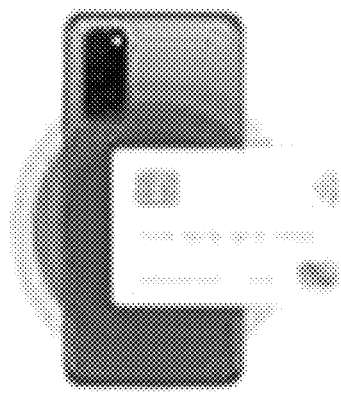
FIG. 5 and FIG. 6 are diagrams showing an example of NFC payment guidance information provided by the mobile phone terminal means.

When NFC simple payment is requested from the said payment service system 100 to the user's mobile phone terminal means 300, the simple payment application program confirms whether the NFC function of the mobile phone terminal means 300 is activated, and if the NFC function is not activated, automatically activates the NFC function or guides the user to activate the NFC function, then, as shown in FIG. 5, it displays to the use the NFC card payment guidance information for the payment method that proceeds with payment (NFC simple payment) by contacting or approaching the payment card (for example, a credit card, etc.) with the NFC function to the mobile phone terminal means 300.

Figure 6:

On the other hand, when the payment service system 100 receives the request for simple payment service from the call system 200, it may receive payment information containing the product name and payment amount as well as the phone number information of the mobile phone terminal means 300 as payment request information, in this case, as shown in FIG. 6, it may guide the user by displaying the product name, payment amount, and payment method through the simple payment application program.

Here, when the NFC function of the mobile phone terminal means 300 is not activated, the simple payment application program may display guidance information to the user to activate the NFC function and induce to activate the NFC function.

The user performs the NFC card payment by contacting or approaching the NFC tag-capable payment card to the mobile phone terminal means 300, and the mobile phone terminal means 300 uses the NFC function to read card information necessary for card payment, such as card number and expiration date.

Figure 7:
FIG. 7 is a diagram showing an example of the credit card tag according to an embodiment.

FIG. 7 shows an example of the user's payment card tag.

At this time, the card information is read after requesting authorization for permission to collect card information from the external server, that is, the payment system 400, in this case, it may be configured to obtain the authentication for permission to access the NFC chip where payment card information is stored through communication with the payment system 400 and proceed.

Accordingly, when the user tags the payment card to the mobile phone terminal means 300, it requests the permission to collect the card from that card payment system 400, and may request authorization to collect card information by providing the user's phone number.

The mobile phone terminal means 300 transmits the card information read through the simple payment application program to the payment service system 100 as described above.

At this time, the mobile phone terminal means 300 encrypts the read card information to transmit it to the payment service system 100, and the encrypted card information as described above is transmitted to the call system 200 and provided to the payment system 400, so that card information may be allowed to be confirmed by being decrypted in the payment system 400.

It is to provide the application program to the payment system 400 so that it can be encrypted in the simple payment application program of the mobile phone terminal means 300 and decrypted only by the payment system, thereby the user's card information cannot be confirmed in the payment service system 100 or call system 200.

In the payment service system 100, the card information received as above is transmitted to the call system 200, and in the call system 100, the card information sent from the payment service system 100 is transmitted to the payment system 400 as payment authorization request information along with payment amount information (price information) to request payment authorization. At this time, the call system 100 may also request payment authorization by transmitting the phone number information of the user's mobile phone terminal means 300 together with it to the payment system 400.

On the other hand, in the payment system 400, payment may be authorized in response to payment authorization request information from the payment service system 100 containing card information and the payment authorization information may be transmitted to the call system 200 through the payment service system 100 to complete the payment.

At this time, in the payment system 400, it can prevent unauthorized use of the card by confirming the phone number and card number of the user's mobile phone terminal means 300 in the payment authorization request information and authorizing the payment.

In the call system 200, when payment authorization information is received, the agent or ARS in the call system 200 notifies the user in the call state that the payment has been completed, and ends the call.

In addition, as another embodiment of the system, the payment authorization request may be made directly from the payment service system 100 to the payment system 400.

It consists of including: a process in which the payment service system 100 receives payment request information containing phone number information of the mobile phone terminal means 300 of the user currently connected to the call from the call system 200 and receives a request for simple payment service;

a process in which the payment service system 100 determines whether the phone number of the mobile phone terminal means 300 is of the registered user and if so, requests communication to the mobile phone terminal means 300, to confirm whether the simple payment application program is installed and running on the mobile phone terminal means 300, and thereby confirms whether that user is currently capable of making NFC payment;

a process in which when the simple payment application program is not installed on the mobile phone terminal means 300 or when the phone number is not registered as the user, the payment service system 100 transmits installation link information for the simple payment application program to the mobile phone terminal means 300;

a process in which if the user's mobile phone terminal means 300 is currently capable of NFC payment, the payment service system 100 makes the request NFC simple payment to the user through the simple payment application program installed on the user's mobile phone terminal means 300 in response to the simple payment service request received from the call system 200; and a process in which if the payment service system 100 receives the card information collected through NFC payment from the mobile phone terminal means 300, the received card information as the payment authorization request information is transmitted to the payment system 400.

At this time, when the payment service system 100 receives payment authorization information from the payment system 400, a process of transmitting the payment authorization information to the call system 200 may be further included.

In embodiments, the payment authorization requests to be made directly from the payment service system 100 to the payment system 400, when card information is received from the mobile phone terminal means 300 as described above, the payment service system 100 requests payment authorization from the payment system 400, and when payment authorization information is received from the payment system 400, it is provided to the call system 200 to complete the payment process as described above.

As described above, in the case where the payment authorization request is made directly from the payment service system 100 to the payment system 400, the payment service system 100 receives payment information including the payment amount as well as the phone number information of the user's mobile phone terminal means 300 from the call system 200 as payment request information and receives the request for simple payment service. Accordingly, in the payment service system 100, the card information is transmitted to the payment system 400 as payment authorization request information along with payment amount information (price information) to request payment authorization. At this time, the payment service system 100 may also request payment authorization by transmitting the phone number information of the user's mobile phone terminal means 300 together with it to the payment system 400.

On the other hand, in the payment system 400, payment is authorized in response to payment authorization request information from the payment service system 100 containing card information and the payment authorization information is sent to the payment service system 100 and transmitted to the call system 200, or in some cases, it is transmitted directly to the call system 200 to complete the payment.

At this time, in the payment system 400, it can prevent unauthorized use of the card by confirming the phone number and card number of the user's mobile phone terminal means 300 in the payment authorization request information and authorizing the payment.

In the case where the payment system 400 transmits payment authorization information to the call system 200, when payment authorization information is received in the call system 200, the agent or ARS in the call system 200 notifies the user in the call state that the payment has been completed, and ends the call.

Whereas, when the payment system 400 transmits payment authorization information to the payment service system 100, while the payment service system 100 notifies the call system 200 that the payment has been completed when the payment authorization information is received, it transmits the purchase completion information to the simple payment application program installed on the user's mobile phone terminal means 300, and the mobile phone terminal means 300 may notify the user by displaying that payment has been completed through the simple payment application program and the purchase has been completed.

When the call system 200 receives notification from the payment service system 100 that payment has been completed, the agent or ARS in the call system 200 notifies the user in the call state that the payment has been completed, and ends the call.

Figure 3:
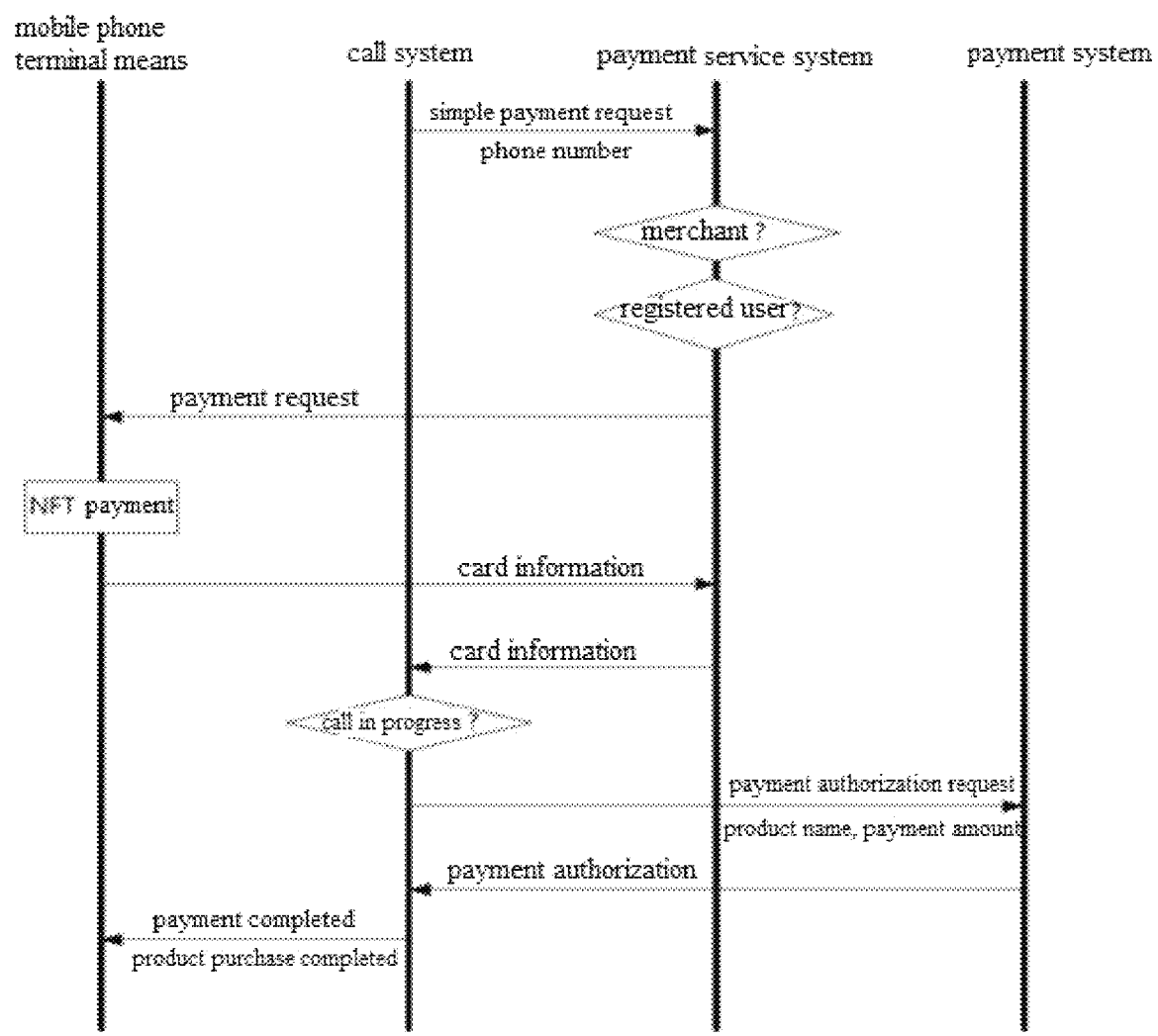
FIG. 3 is a diagram showing a process of the NFC simple payment service according to an embodiment.

The method for the NFC simple payment service for the call system in embodiments can show the execution process as in FIG. 3.

It consists of including: a first process performed in the call system 200, which provides payment request information for the mobile phone terminal means 300 to the payment service system 100 and requests simple payment service while the call is connected to the user's mobile phone terminal means 300;

a second process performed in the payment service system 100, which when payment request information is received from the call system 200 and simple payment service is requested, determine whether to proceed with the simple payment service for the registered merchant by confirming the merchant information and confirming whether the merchant using that call system 200 is the registered merchant; a third process performed in the payment service system 100 in the case of the registered merchant, which determines whether the user is the registered user by checking the phone number of the mobile phone terminal means 300 for which the simple payment service has been requested and if so, requests communication to the mobile phone terminal means 300, to confirm whether the simple payment application program is installed and running on the mobile phone terminal means 300, and thereby confirms whether that user is currently capable of making NFC payment; a fourth process in which if the simple payment application program is not installed on the mobile phone terminal means 300 or if the phone number is not registered as the user, transmits installation link information of the simple payment application program to the mobile phone terminal means 300; a fifth process performed in the payment service system 100, which when the user's mobile phone terminal means 300 is currently in the state where NFC payment is possible, requests the user to make the NFC simple payment through the simple payment application program installed on the user's mobile telephone terminal means 300 in response to the request for simple payment service received from the call system 200; a sixth process performed in the mobile phone terminal means 300, which activates the NFC simple payment application program in response to the communication request from the payment service system 100, determines the status of the NFC function, activates the NFC function if it is not activated, and displays and provides NFC card payment guidance information to the user; a seventh process performed in the mobile phone terminal means 300, which performs NFC card payment when the payment card is tagged, reads card information required for card payment, such as card number and expiration date, and transmits the card information read to the payment service system 100; an eighth process performed in the payment service system 100, which transmits the received card information as payment authorization request information from the payment system 400 to the call system 200 when the card information collected through NFC payment from the mobile phone terminal means 300 is received; a ninth process performed in the call system 200, which requests payment authorization by sending card information together with payment information containing the payment amount when the call system 200 receives card information from the payment service system 100; a tenth process performed in the payment system 400, which confirms the card information and the payment information when payment authorization is requested from the call system 200, performs the payment authorization process, and transmits the payment authorization information to the call system 200; and an eleventh process performed in the call system 200, which completes the payment process when payment authorization information is received from the payment system 400, and provides that payment is completed to the user's mobile phone terminal means 300.

On the other hand, when the business operator operating the payment service system 100 provides the vendor with the use of the call system (or call system program) operated on the cloud basis, it may be confirmed that the vendor is the merchant by using the call system provided by the business operator operating the payment service system 100, and therefore the second process that determine whether to proceed with the simple payment service for the registered merchant by confirming the merchant information and confirming whether the merchant using that call system 200 is the registered merchant, is may be omitted.

In the method for NFC simple payment service for the call system in embodiments, the said seventh process further includes requesting authority to access the NFC chip from the payment system 400 in collecting card information from the payment card, and collecting the card information according to whether the payment system 400 is authorized.

The said ninth process further includes checking the call state with the mobile phone terminal means 300 when the card information is received from the payment service system 100 and providing payment interruption information to the mobile telephone terminal means 300 in the state in which the call is disconnected, and making the payment authorization request to the payment system 100 in the state in which the call state is connected.

In the said ninth process, it includes the phone number information of the user's mobile phone terminal means 300 as payment authorization request information, and the said tenth process further may include the authentication process for the actual owner of the card that allows payment authorization to be made by comparing the phone number of the mobile phone terminal means 300 with the registered card user phone number when requesting payment authorization from the call system 200.

This authentication process may also be performed in the payment system, but it may be performed by transmitting the phone number of the card user registered in advance in the payment system 400 to the payment service system 100 to proceed with the authentication process in the payment service system 100.

Figure 4:
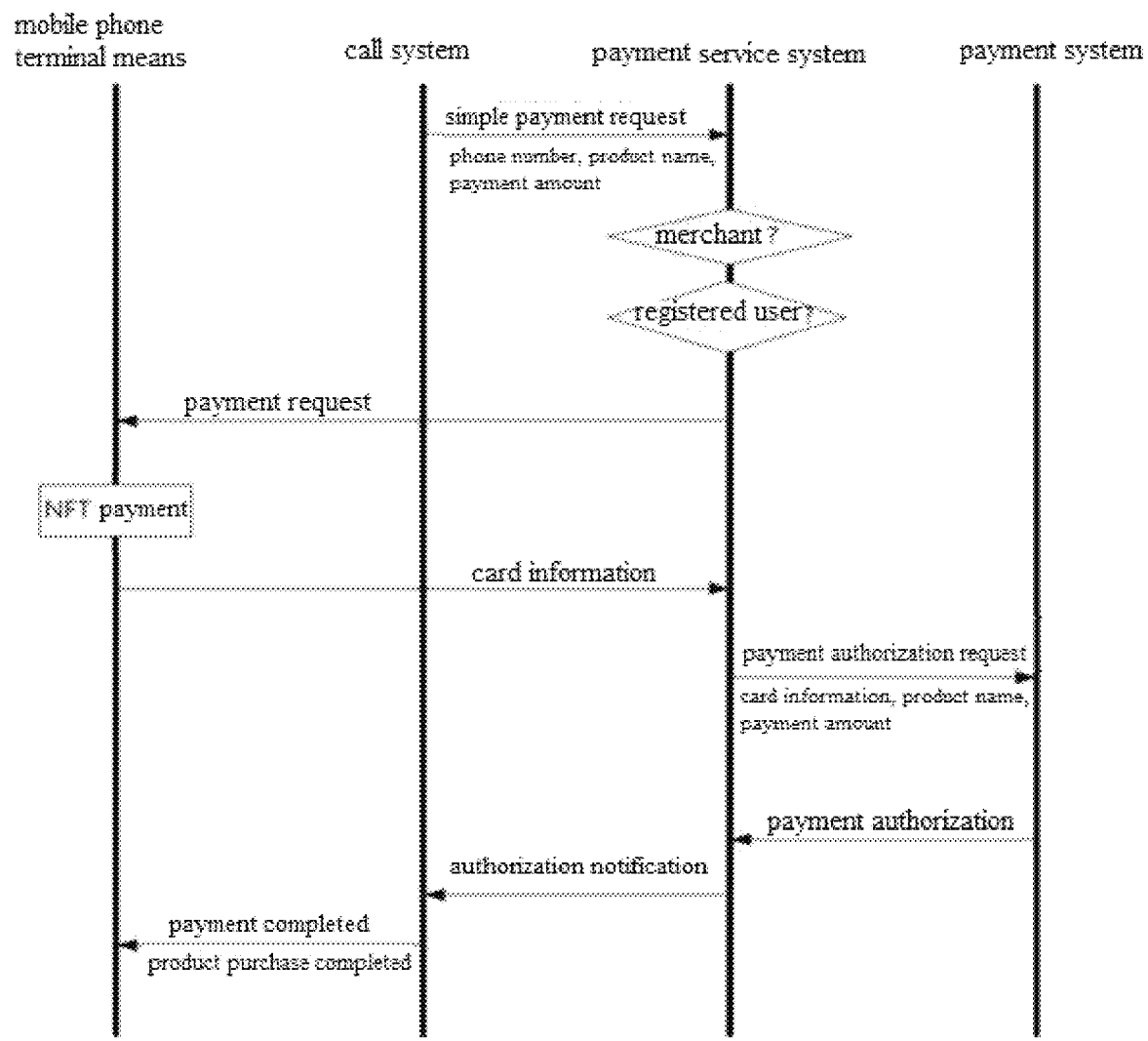
FIG. 4 is a diagram showing a progress of another embodiment of NFC simple payment service. (Request for payment authorization from the payment service system to the payment system)

In addition, as shown in FIG. 4, the system can configure another embodiment in which payment authorization is requested from the payment service system 100 to the payment system 400.

It consists of including: a first process performed in the call system 200, which provides payment request information containing phone number information and the amount of payment for the mobile phone terminal means 300 to the payment service system 100 and requests simple payment service while the call is connected to the user's mobile phone terminal means 300; a second process performed in the payment service system 100, which when payment request information is received from the call system 200 and simple payment service is requested, determine whether to proceed with the simple payment service for the registered merchant by confirming the merchant information and confirming whether the merchant using that call system 200 is the registered merchant; a third process performed in the payment service system 100 in the case of the registered merchant, which determines whether the user is the registered user by checking the phone number of the mobile phone terminal means 300 for which the simple payment service has been requested and if so, requests communication to the mobile phone terminal means 300 to confirm whether the simple payment application program is installed on the mobile phone terminal means 300, and thereby confirms whether that user is currently capable of making NFC payment; a fourth process in which if the simple payment application program is not installed on the mobile phone terminal means 300 or if the phone number is not registered as the user, transmits installation link information of the simple payment application program to the mobile phone terminal means 300; a fifth process performed in the payment service system 100, which, when the user's mobile phone terminal means 300 is currently in the state where NFC payment is possible, requests the user to make the NFC simple payment through the simple payment application program installed on the user's mobile telephone terminal means 300 in response to the request for simple payment service received from the call system 200; a sixth process performed in the mobile phone terminal means 300, which activates the simple payment application program in response to the communication request from the payment service system 100, determines the status of the NFC function, activates the NFC function if it is not activated, and displays and provides NFC card payment guidance information to the user; a seventh process performed in the mobile phone terminal means 300, which performs NFC card payment when the payment card is tagged, reads card information required for card payment, such as card number and expiration date, and transmits the card information read to the payment service system 100; a twelfth process that transmits the received card information as payment authorization request information to the payment system 400 when the card information collected through NFC payment from the mobile phone terminal means 300 is received; a thirteenth process performed in the payment system 400, which confirms the card information and the payment information when payment authorization is requested from the payment service system 100, performs the payment authorization process, and transmits the payment authorization information to the call system 200 or the payment service system 100; a fourteenth process performed in the payment service system 100, which when payment authorization information is received from the payment system 400, transmits it to the call system 200; and a fifteenth process performed in the call system 200, which when payment authorization information is received from the payment service system 100, completes the payment process and provides the completion of payment to the user's mobile phone terminal means 300.

On the other hand, when the business operator operating the payment service system 100 provides the vendor with the use of the call system (or call system program) operated on the cloud basis, it may be confirmed that the vendor is the merchant by using the call system provided by the business operator operating the payment service system 100, and therefore the second process that determine whether to proceed with the simple payment service for the registered merchant by confirming the merchant information and confirming whether the merchant using that call system 200 is the registered merchant, is may be omitted.

In the twelfth process, it include the phone number information of the user's mobile phone terminal means 300 as payment authorization request information, and the said thirteenth process further may include the authentication process for the actual owner of the card that allows payment authorization to be made by comparing the phone number of the mobile phone terminal means 300 with the registered card user phone number when requesting payment authorization from the payment service system 100.

On the other hand, in the said thirteenth process, when the payment system transmits payment authorization information directly to the call system 200 rather than the payment service system 100, the fourteenth process in which the payment service system 100 transmits payment authorization information to the call system 200 is omitted, and as the said fifteenth process, when payment authorization information is received in the call system 200, the agent or ARS in the call system 200 may notify the user in the call state that the payment has been completed, and end the call.

In embodiments as described above, while home shopping is in progress, the NFC payment method is provided by simply activating the simple payment application program in the user's mobile phone terminal means according to the call connection status with the agent or ARS, thereby enabling NFC payment to be made, it is possible to provide the NFC simple payment system that allows the user to make NFC payment by contacting only the physical card, unlike the user simply running the application program in the mobile phone terminal means, making payment according to the payment procedure, and allowing NFC payment to be made.

Computer-Executable Instructions

Logical blocks, modules or units described in connection with implementations disclosed herein may be implemented or performed by a computing device having at least one processor, at least one memory and at least one communication interface. The elements of a method, process, or algorithm described in connection with implementations disclosed herein can be embodied directly in hardware, in a software module executed by at least one processor, or in a combination of the two. Computer-executable instructions for implementing a method, process, or algorithm described in connection with implementations disclosed herein can be stored in a non-transitory computer readable storage medium.

Interpretation of Singular Terms

It should be understood that when a singular term (such as "a", "an", "the", "said", or other similar terms) is used, it is being used in a generic sense rather than in a specific sense. Unless clearly indicated to the contrary, such a singular term should be interpreted to include not just a single entity, but also multiple entities. For example, the term "a server (system)" may be understood as "one or more servers (systems)" to cover scenarios where there are multiple servers. For example, the term "a communication (request, instruction)" may be understood as "one or more communications (requests, instructions)" where there are multiple communications.

Changes and Modifications Example Embodiments

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A method of smartphone processing for an NFC-enabled payment, the method comprising:
    while a user is on a telephone call using a smartphone with a counterpart for a transaction, receiving, by the smartphone, at least one communication (referred to as "a first communication") that is in a predetermined format to be recognized by the smartphone and comprises instructions to the smartphone for causing the smartphone
        to determine if a near field communication (NFC) functionality of the smartphone is active for communication with a counterpart NFC device,
        if it is determined that the NFC functionality is active, to provide a suggestion that the user tap an NFC-enabled payment card with the smartphone to proceed with a payment for the transaction, and
        if it is determined that the NFC functionality of the smartphone is inactive, to initiate a process to activate the NFC functionality or to generate a notification to the user for activating the NFC functionality;
    subsequently, in response to tapping of a first NFC-enabled payment card with the smartphone and while the user is still on the telephone call with the counterpart, communicating, by the smartphone, with the first NFC-enabled payment card to receive identification information for use in identifying the first NFC-enabled payment card;
    subsequent to receiving the identification information and while the user is still on the telephone call with the counterpart, sending, by the smartphone, the identification information or an equivalent thereof to at least one server for processing the payment for the transaction with an account associated with the first NFC-enabled payment card;
    further subsequent to sending the identification information and while the user is still on the telephone call with the counterpart, receiving, by the smartphone, at least one communication (referred to as "a second communication") for causing to display information confirming the payment for the transaction on a display screen of the smartphone; and
    completing the transaction in response to detecting that the payment has been completed.

2. The method of claim 1, wherein the first communication is to activate a mobile application pre-installed on the smartphone and to cause the mobile application to determine if the NFC functionality of the smartphone is active, wherein if it is determined that the NFC functionality of the smartphone inactive, the mobile application is to initiate the process to activate the NFC functionality or the notification to the user to activate the NFC functionality.

3. The method of claim 2, wherein the mobile application installed on the smartphone is configured to detect a telephone number in response to an outgoing telephone call from the smartphone and further configured to retrieve an internet content pre-associated with the telephone number for displaying on the display screen of the smartphone.

4. The method of claim 2, wherein the mobile application installed on the smartphone is configured to trigger displaying of an internet content pre-associated with a third person in response to receipt of at least one communication initiated by the third person during a telephonic conversation with the third person.

5. The method of claim 1, wherein, upon receiving the identification information and while the user is still on the telephone call with the counterpart, the smartphone sends the identification information or the equivalent thereof to the at least one server.

6. The method of claim 1, wherein the equivalent thereof comprises a processed version of the identification information that can be used to identify the first NFC-enabled payment card.

7. The method of claim 1, wherein the first communication is initiated by the counterpart.

8. The method of claim 1, wherein the smartphone receives the first communication from at least one server that is not under control by the counterpart.

9. The method of claim 1, wherein the telephone call between the user and the counterpart is initiated by the user using the smartphone while the counterpart is broadcasting a promotional content of a product or service that is at least part of the transaction.

10. A non-transitory computer readable medium storing instructions that, when executed by at least one processor, cause a smartphone to perform the method of claim 1.

11. A method of smartphone processing for an NFC-enabled payment, the method comprising:
    while a user is on a telephone call using a smartphone with a counterpart for a transaction, receiving, by the smartphone, at least one communication (referred to as "a first communication") that is in a predetermined format to be recognized by the smartphone and comprises instructions to the smartphone
        for activating a mobile application pre-installed on the smartphone,
        for confirming that near field communication (NFC) functionality of the smartphone is active for communication with a counterpart NFC device, and further for displaying on a display screen of the smartphone a suggestion that the user tap an NFC-enabled payment card with the smartphone to proceed with a payment of an amount for the transaction;

subsequently, in response to tapping of a first NFC-enabled payment card with the smartphone and while the user is still on the telephone call with the counterpart, communicating, by the smartphone, with the first NFC-enabled payment card to receive identification information for use in identifying the first NFC-enabled payment card;

subsequent to receiving the identification information and while the user is still on the telephone call with the counterpart, sending, by the smartphone, the identification information or an equivalent thereof to at least one server for processing the payment of the amount for the transaction with an account associated with the first NFC-enabled payment card;

further subsequent to sending the identification information and while the user is still on the telephone call with the counterpart, receiving, by the smartphone, at least one communication (referred to as "a second communication") for causing to display, on the display screen, information confirming the payment for the transaction; and completing the transaction in response to detecting that the payment has been completed.

12. The method of claim 11, wherein the mobile application installed on the smartphone is configured to detect a telephone number in response to an outgoing telephone call from the smartphone and further configured to retrieve an internet content pre-associated with the telephone number for displaying on the display screen of the smartphone.

13. The method of claim 11, wherein the mobile application installed on the smartphone is configured to trigger displaying of an internet content pre-associated with a third person in response to receipt of at least one communication initiated by the third person during a telephonic conversation with the third person.

14. The method of claim 11, wherein upon activation, the mobile application determines if the NFC functionality of the smartphone is active, wherein if it is determined that the NFC functionality of the smartphone inactive, the mobile application initiates a process to activate the NFC functionality or to generate a notification to the user for activating the NFC functionality.

15. The method of claim 11, wherein, upon receiving the identification information and still on the telephone call with the counterpart, the mobile application causes the smartphone to send the identification information or the equivalent thereof to the at least one server.

16. The method of claim 11, wherein the equivalent thereof comprises a processed version of the identification information that can be used to identify the first NFC-enabled payment card.

17. The method of claim 11, wherein the first communication is initiated by the counterpart.

18. The method of claim 11, wherein the smartphone receives the first communication from at least one server that is not under control by the counterpart.

19. The method of claim 11, wherein the telephone call between the user and the counterpart is initiated by the user using the smartphone while the counterpart is broadcasting a promotional content of a product or service that is at least part of the transaction.

20. A non-transitory computer readable medium storing instructions that, when executed by at least one processor, cause a smartphone to perform the method of claim 11.

* * * * *